(12) United States Patent
Lopes (10) Patent No.: US 12,484,831 B2
(45) Date of Patent: Dec. 2, 2025

(54) LEAD CABLE ORGANIZER AND HOLDER

(71) Applicant: Kevin Lopes, East Rutherford, NJ (US)

(72) Inventor: Kevin Lopes, East Rutherford, NJ (US)

( * ) Notice: Subject to any disclaimer, the term of this patent is extended or adjusted under 35 U.S.C. 154(b) by 0 days.

(21) Appl. No.: 19/198,307

(22) Filed: May 5, 2025

(65) Prior Publication Data

US 2025/0261895 A1    Aug. 21, 2025

(51) Int. Cl.
*A61B 5/30* (2021.01)
*A61B 5/282* (2021.01)
*A61B 5/308* (2021.01)

(52) U.S. Cl.
CPC .............. *A61B 5/303* (2021.01); *A61B 5/282* (2021.01); *A61B 5/308* (2021.01)

(58) Field of Classification Search
CPC ......... A61B 5/303; A61B 5/282; A61B 5/308; H02G 3/32; H02G 3/00; H02G 3/02; H02G 3/04; H02G 3/0437
See application file for complete search history.

(56) References Cited

U.S. PATENT DOCUMENTS

| | | | | |
|---|---|---|---|---|
| 5,389,082 A * | 2/1995 | Baugues | ............... | A61M 25/02 248/68.1 |
| 5,566,269 A * | 10/1996 | Eberle, Jr. | ............ | G02B 6/4454 385/136 |
| 6,620,105 B2 * | 9/2003 | Sharpe | ................... | A61B 5/303 385/139 |
| 2011/0210215 A1 * | 9/2011 | Nitsche | ..................... | F16L 3/24 248/74.1 |
| 2015/0089774 A1 * | 4/2015 | Kalejaiye | ................. | H02G 3/32 24/122.3 |
| 2023/0200708 A1 * | 6/2023 | Baumer | ............... | A61B 5/6823 600/509 |

\* cited by examiner

*Primary Examiner* — Adam Z Minchella
(74) *Attorney, Agent, or Firm* — SLEMAN & LUND LLP (57) ABSTRACT

The disclosed device is a clamp intended to organize wire/leads of an ECG device, or any machinery having a plurality of loosely hanging wires or connectors, each of which is intended to fulfill and individualized purpose. The disclosed clamp device is intended to clamp onto all cables at the same time and have the ability to freely slide along the length of the cables as required. Thus, if the machine is idle, with leads handing downward, the clamp device will preferably be located near the distal ends of the leads, which is the best location to ensure that the cables do not get entangled. Once the leads are required for a procedure and are then raised to be placed on a patient's body, the clamp slides away under the force of gravity to the lowest point along the cable.

13 Claims, 8 Drawing Sheets

LEAD CABLE ORGANIZER AND HOLDER

FIELD OF INVENTION

The present invention is related to a clamp designed to prevent entanglements and scrambling of wires and cables.

BACKGROUND OF THE INVENTION

An electrocardiogram (ECG or EKG) monitor is a medical device used to measure and record the electrical activity of the heart over a period of time. It serves as a critical diagnostic tool in the detection and monitoring of various cardiac conditions. The ECG monitor works by detecting electrical impulses generated by the depolarization and repolarization of cardiac muscle cells during each heartbeat. These impulses are captured by electrodes, also known as leads, placed on the skin and are translated into a graphical representation on a screen or printed on paper.

The existence of multiple leads in an ECG system is essential for providing a comprehensive view of the heart's electrical activity. A standard 12-lead ECG, for example, uses 10 electrodes to generate 12 distinct perspectives of the heart. Each lead represents a specific axis or plane of electrical activity, allowing for a detailed analysis of the heart's function from different anatomical orientations.

The leads used in an electrocardiogram (ECG) monitoring system are approximately 60 to 100 centimeters (24 to 40 inches) long—to allow for convenient placement of electrodes on the patient's body without excessive tension or restriction of movement. In clinical or emergency settings, some systems may have even longer leads to accommodate different scenarios, such as allowing healthcare providers to monitor patients from a safe distance or in crowded environments.

The downside of having lengthy leads or cables is an ongoing challenge to keep them from becoming entangled or damaged when not in use. Additionally, entangled leads will delay the deployment of ECG cables on a patient's body and lead to errors in placing the leads at proper locations. Proper placement of the ECG leads is critical for accurate interpretation of the heart's electrical activity. Each lead corresponds to a specific anatomical location and axis of electrical measurement. If the leads are jumbled by incorrect placement of the electrodes on the patient's body it can lead to failure to detect proper pathology, misdiagnosis, and generally to distortions in the signal. For this reason, a device or clamp that assists with maintaining separation between leads and prevents their entanglement, and which does not interfere with the operations of the leads would be highly desirable.

While the above describes an EKG machine, similar considerations would apply to any equipment that collects health information using cables or leads. Scrambled or entangled cables wastes valuable time and often results in incorrect results. Therefore, a device that maintains leads or cables in a joined but organized fashion would be highly desirable.

SUMMARY OF THE INVENTION

The disclosed device is a clamp intended to organize wire/leads of an ECG device, or any machinery having a plurality of loosely hanging wires or connectors, each of which is intended to fulfill an individualized purpose. The disclosed clamp device is intended to clamp onto all cables at the same time and have the ability to freely slide along the length of the cables as required. Thus, if the machine is idle, with leads handing downward, the clamp device should preferably engage the distal ends of the leads, which is the best location to ensure that the cables do not get entangled. Once the leads are required for a procedure and are then raised to be placed on a patient's body, the clamp slides away under the force of gravity to the lowest point along the cable.

The disclosed device is shown having a first portion and a second portion. The first and second portions are configured to be detachable in a symmetric and parallel orientation with each other. Each of the first and second portions further having a top side and a bottom side, as well as points identified as a first end and a second end. The first and second portions having a plurality semicylindrical grooves running across the width of the first and second portions, otherwise referred to, from top side to the bottom side of the first and second portions. Each semicylindrical groove is created with a counterpart semicylindrical groove on the opposing first or second portion, such that when the first and second portions are coupled together, the semicylindrical grooves combine to form a complete channel.

It is preferred that the first and second portions have a combination of male and female connectors that snap or dovetail together wherein said first portion and said second portion further comprising connectors configured to couple said first portion and said second together.

In another embodiment, channels can be grouped into at least one group of adjacent channels.

In yet another embodiment, the clamp device features at least one grip area. The grip area can be on either or both of the first or second ends of the first and second portions that are coupled together, or between two groups of adjacent channels.

In another embodiment, the inner edge of the channels on the bottom side of the first and second portions are tapered. The tapering is designed to act as a socket around the lead connectors or electrodes. The tapered edge is engaged when the clamp device is at the very end of the lead wires, typically while the leads are hanging off of an idle machine, an at-rest position.

It is preferred that each of the channels forms a loose ring around the cable such that the clamp device can easily slide along the cable either by a force of a hand displacing it to a desired location along the cable, or by force of gravity. Therefore, when the leads are hanging down, the holder or the clamp will naturally slide to the end of the leads and thus keep the very end of the cables separated. This will in turn, keep the rest of the wires separated as well. Once the wires are lifted to be placed on a patient, the clamp will naturally slide out of the way to the then lowest point along the length of the cables.

It is one objective of the present invention to create a clamp that is able to keep loose cables of an electrical device, such as an ECG machine, in a combined arrangement that avoids entanglement.

It is still another objective of the disclosed invention to provide a removable clamp that functions as an organizer for cables that does not interfere with regular operations of an electrical instrument, such as an EKG machine.

It is still another objective of the disclosed invention to provide a wire holder that easily snaps on and off of the existing cables, and which freely travels along the length of cables.

DETAILED DESCRIPTION OF THE INVENTION

Embodiments of the present invention will now be described with reference to the drawings. Such embodiments are provided by way of explanation of the present invention, which is not intended to be limited thereto. In fact, those of ordinary skill in the art may appreciate upon reading the present specification and viewing the present drawings that various modifications and variations can be made thereto.

Turning now descriptively to the drawings, in which similar reference characters denote similar elements throughout the several views, the figures illustrate a clamp device 10 comprising of the first portion 12 and the second portion 14. It should be noted that the first and second portions 12 and 14 are interchangeable and what is designated as the first portion 12 can be the second portion 14. It is preferable that first and second portions 12 and 14 can be detached and then re-attached to enclose or release a plurality of cables. It is preferable that the first and second portions 12 and 14 are configured to be parallel and symmetric to each other. Both the first and second portions 12 and 14 have the top side 20 and a bottom side 22, the first end 30 and the second end 32. The first and second portions 12 and 14 contain a plurality semicylindrical grooves 17a and 17b are situated across the first and second portions 12 and 14, running between the top side 20 and the bottom side 22. The grooves 17a and 17b may run straight across the first and second portions 12 and 14 as shown or at some diagonal line. Each semicylindrical groove 17a is preferably a mirror image of each semi-cylindrical groove 17b so as to form a complete channel 16. While Channels in FIG. 1 are shown to be of the same diameter 21, in some channels 16 may be of larger or smaller diameters depending on application.

Each of the channels 16 is configured to admit at least one cable, preferably in a loose fit. The cylindrical channels 16 are preferably arranged adjacently to each other separated by a partition wall 19. The sidewall 18 may consist of a plurality of outwardly curved sidewalls that match the concave curvature of the semi-cylindrical channels 17a and 17b. Alternatively, the outer wall may be substantially uniform with the curvature of the channels 16 being absorbed by the thickness of the first and second portions 12 and 14. It should be noted further that the channels need not be curved, but may be cubic or parallelogrammical in appearance.

Figure 1:
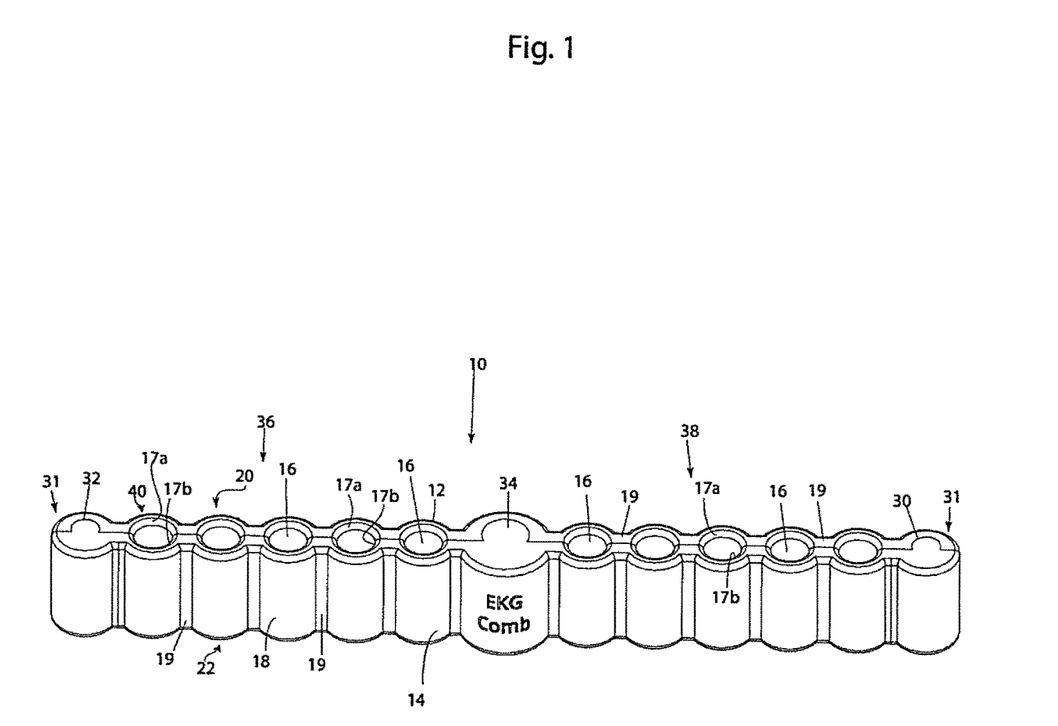
FIG. 1 is a perspective top and side view of the disclosed clamp device.
Figure 2:
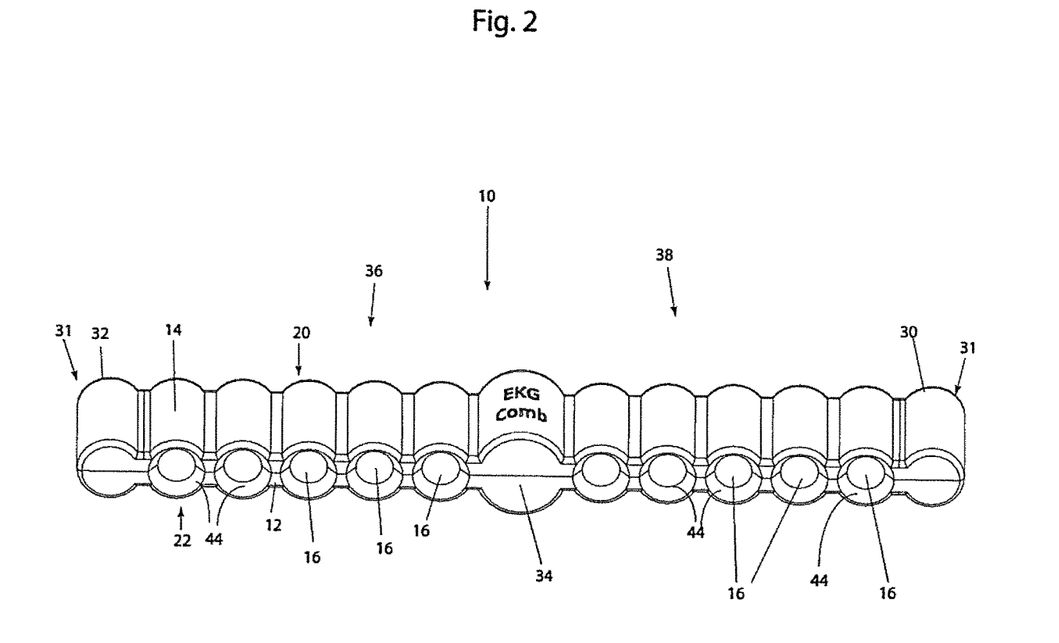
FIG. 2 is a perspective bottom and side view of the disclosed clamp device.

FIG. 2 demonstrates parts of the disclosed clamp device 10 that are not visible in FIG. 1. Shown are a plurality of channels 16 that may be combined into at least one group 36 and another group 38, with a grip area 34 separating between the groups 36 and 38. Additional grip areas 30 and 32 may be disposed at distal ends 31.

The rim 40 around each of the cylindrical channels 16 facing the top side 20 may be curved or angular. It is preferable that the rim 44 of each cylindrical channel 16 on the bottom side 22 is preferably tapered in the direction away from the inside of the cylindrical channel. The tapered rim 44 is intended to accommodate the end wire connector leads 54 (FIGS. 5 and 6) at the end of cables 50 (FIGS. 5 and 6).

Figure 3:
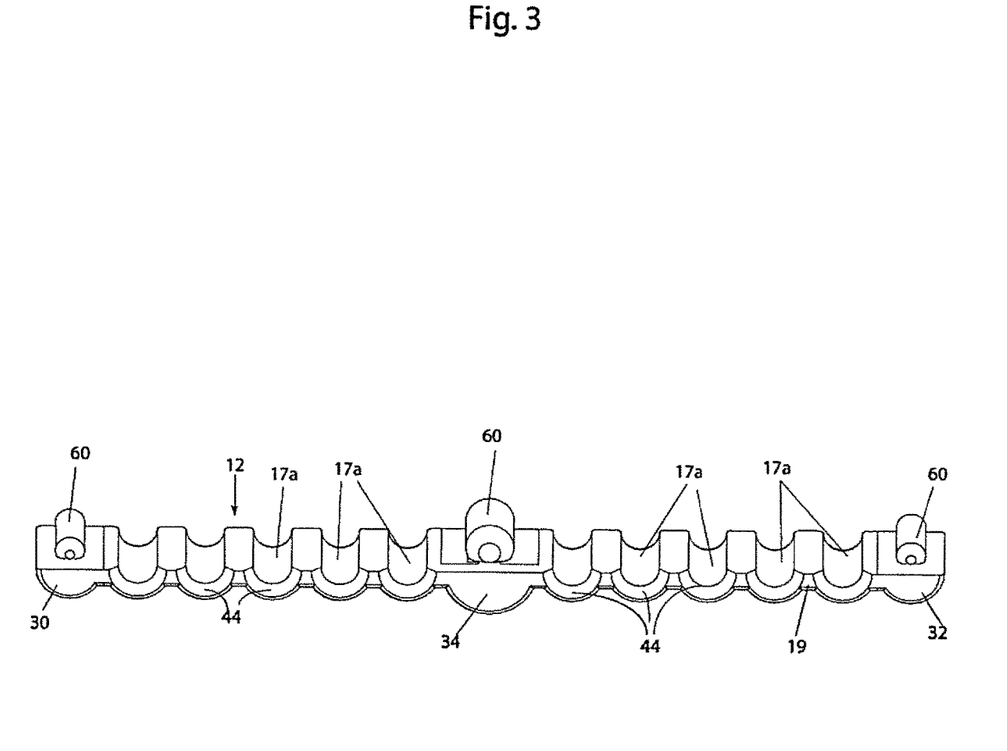
FIGS. 3 and 4 represent individual halves of the parallel first and second portions of the disclosed clamp device.
Figure 4:
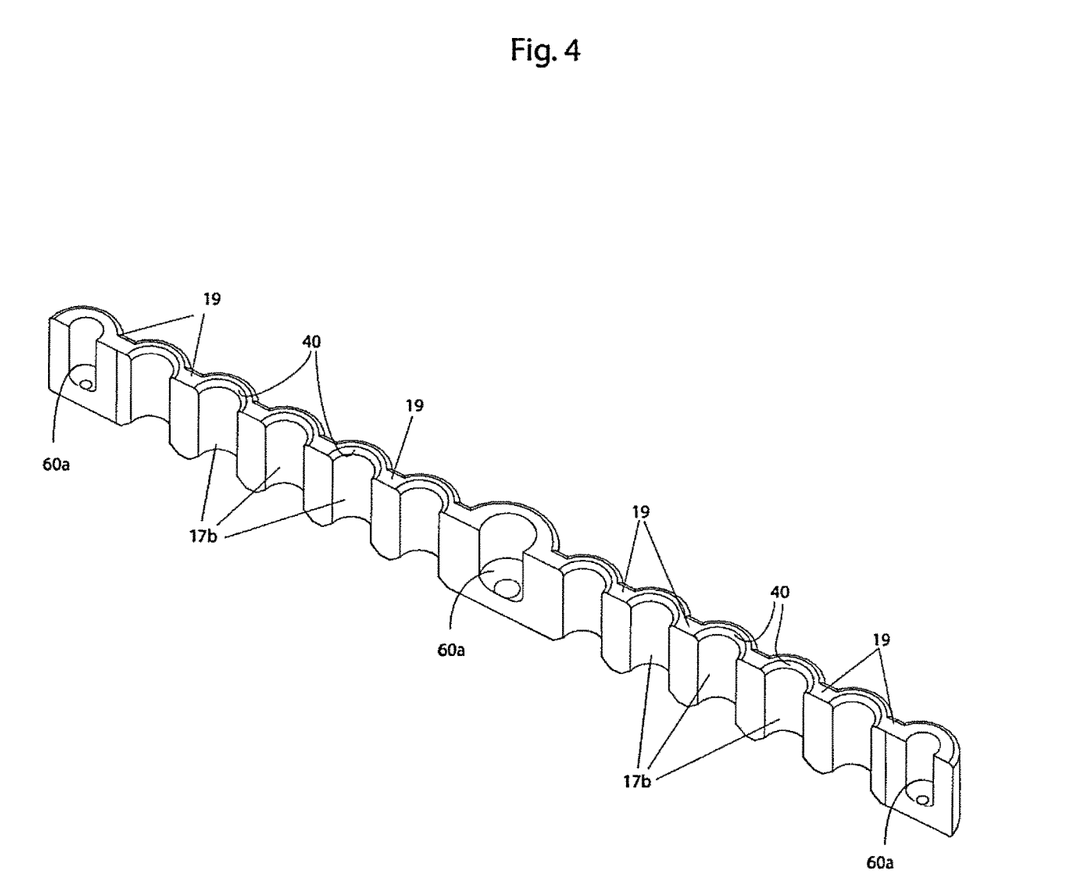

The first portion 12 and second portion 14 are coupled together using connectors 60 and 60a as shown in FIGS. 3 and 4. Connector 60 is shown as a male connector, which slides into the corresponding female connector 60a on the second portion 14 from the bottom side 22. The connectors may be arranged with male connectors 60 extending from the first portion 12, and with female connectors 60a existing as recessed gaps on the second portion 14. Alternatively, male and female connectors may exist on both first and second portions. While male and female type connectors (60 and 60a) may be a dovetail and lug connectors as shown, other possible connectors may be magnetic, snap-to, bayonet, or hook and loop, or any other connectors that may keep first and second portions 12 and 14 in a coupling and decoupling configuration.

Figure 5:
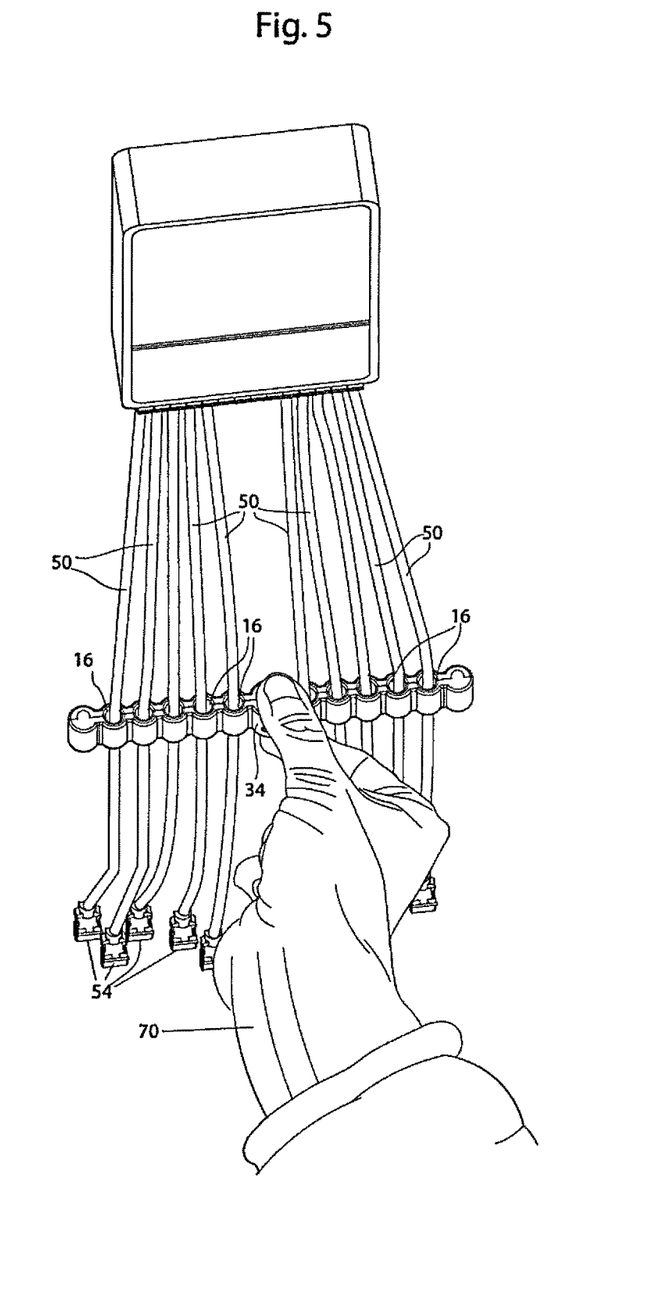
FIG. 5 demonstrates the clamp device that is deployed when leads of an EKG apparatus are idle and at rest.
Figure 6:
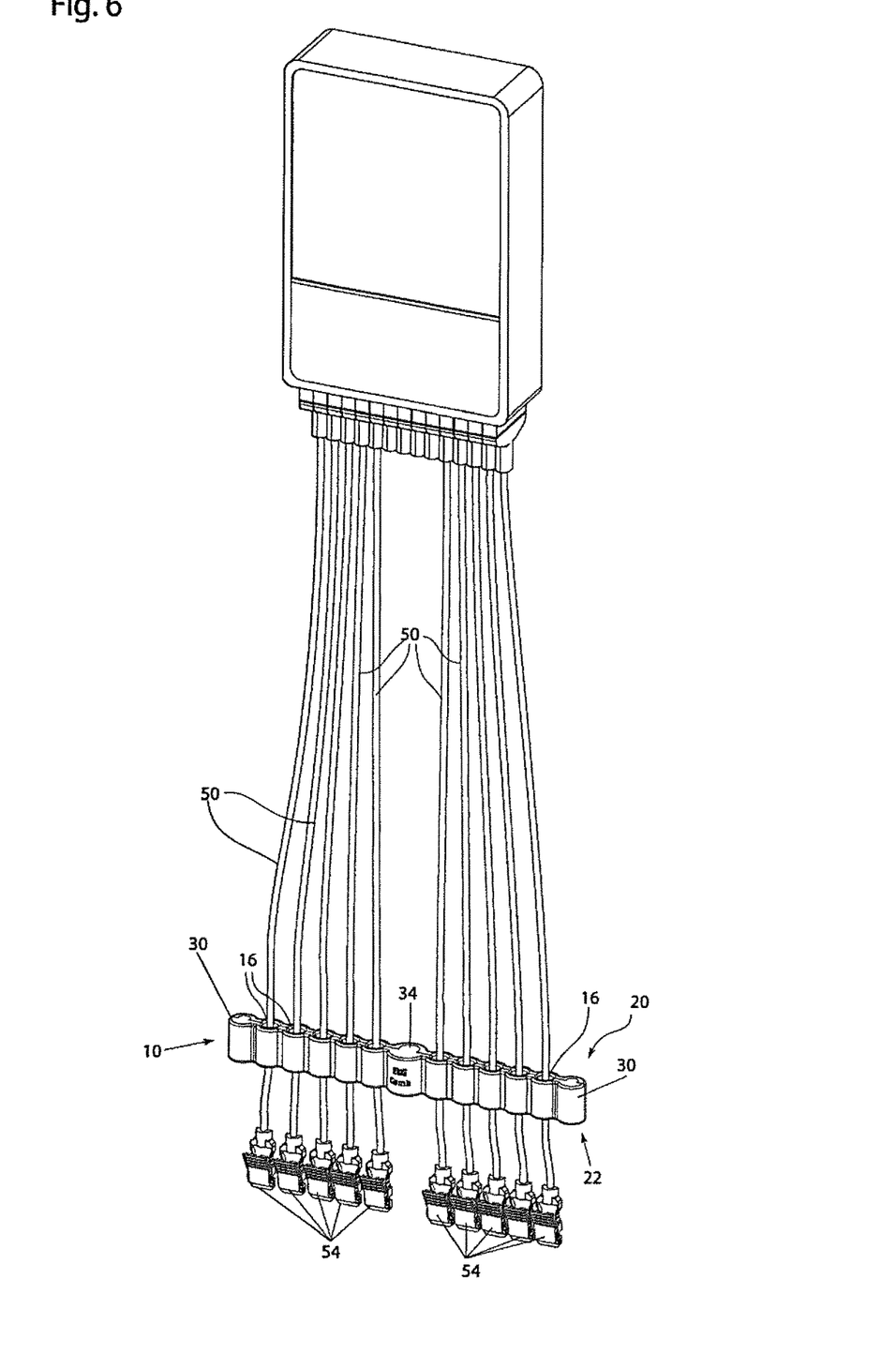
FIG. 6 demonstrates a user operating the clamp device by grasping one of the grip areas to move the clamp device up and down.

FIGS. 4 and 5 demonstrate the utility of the disclosed clamp device 10. Clamp device 10 is affixed over existing cables 50 of an electrical apparatus 52. It is preferred that each of the channels 16 accommodates one cable 50. The clamp device 10 may contain an exact number of channels 16 to match the number of cables 50, or the number of channels 16 may be greater than the number of cables. Distal ends 31 and the midpoints 34 present grip surfaces that enable a user 70 to control where along the length of the cables 50 the clamp device 10 may be located. FIG. 4 demonstrates that while at rest, the cables 50 hang downward, and in the downward position present the greatest risk of entanglement with each other. The clamp device 10 eliminates the entanglement risk by sliding down to the bottom of the cables 50, coming to rest at the electrical connectors 54. The tapered rim 44 allows the electrical connectors to fit to be substantially immobilized within the channels 16, thereby further reducing the risk that the connectors themselves will become entangled with each other. It should be noted that as each cable 50 is lifted upward to be placed on a patient, the clamp device 10 will be configured to freely slide away to the then occurring lowest point along the cables 50 and thus remain clear of the area of active operation of the connectors 54.

Figure 7:
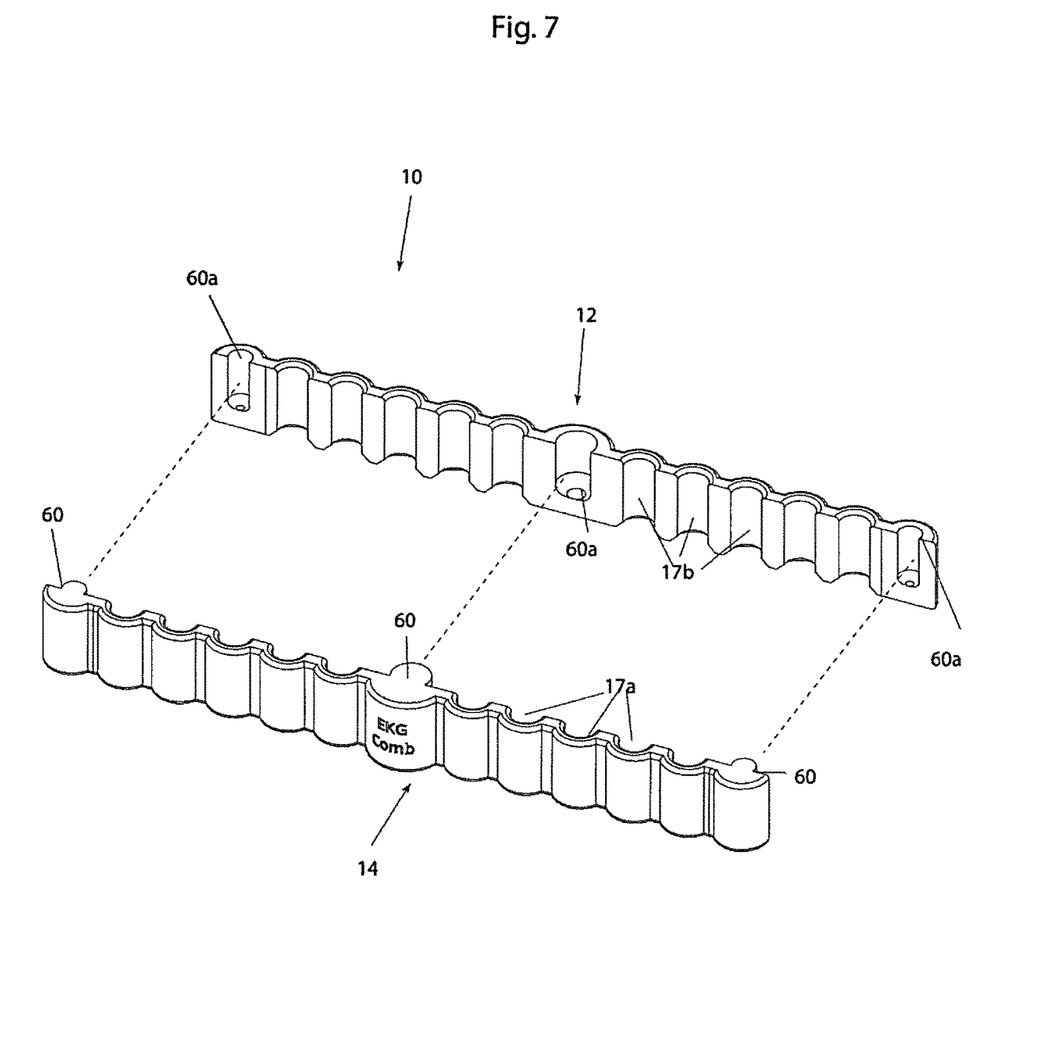
FIG. 7 demonstrates the two parallel portions of the disclosed embodiment of the clamp device.

FIG. 7 demonstrates the combination of the first portion 12 and the second portion 14 of one embodiment of the clamp 10 using peg connectors 60 that snap into socket connectors 60a. Other connectors may be magnetic or utilize externally applied clamps. The semicircular grooves 17b and 17a, when combined form channels 16. The semicircular grooves 17a and 17b may be substantially rectangular or parallelogrammical in shape.

Figure 8:
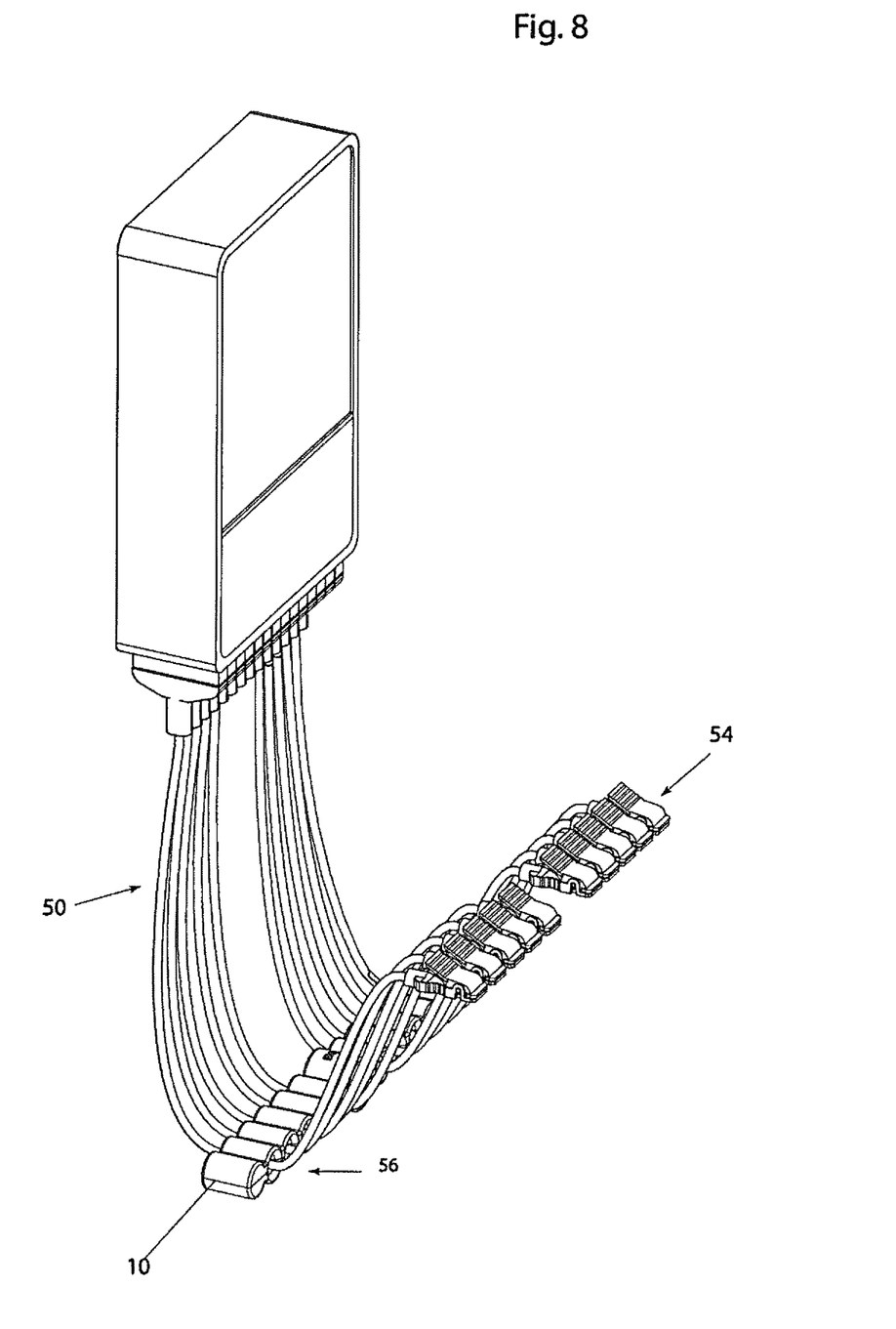
FIG. 8 demonstrates the clamp device in a position when the leads are being used, and the clamp has shifted out of the way on its own under the force of gravity.

While FIG. 6 demonstrates the operation of clamp 10 when the cables 50 are at rest, FIG. 8 demonstrates cables 50 in the position they would assume when in use. When in use, the leads 54 would be elevated to access points along the body of a patient where the lead must be fastened. The rest of the length of the cable 50 will be naturally slackened and hang down below the level of the lead 54. Since the clamp 10 freely slides along the length of the cables 50 that pass through the plurality of channels 16, the clamp will slip down to the lowest point 56 and thereby automatically avoid obstructing ordinary use of cables 50 while still maintaining its essential utility, which is keeping cables 50 together, in a particular order and not tangled.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

The invention claimed is:

1. A system comprising:
a plurality of leads; and
a clamp device including a first portion and a second portion, said first and second portions being in a detachable and parallel orientation with each other, each of said first and second portions having a top side that defines a plurality of inlets for the plurality of leads and a bottom side that defines a plurality of outlets for the plurality of leads, a first end and a second end, said first and second portions including a plurality of semicylindrical grooves extending from said top side to said bottom side, each of said plurality of semicylindrical grooves forming a complete cylindrical channel when said first portion and said second portion are coupled together forming a plurality of cylindrical channels for receiving the plurality of leads, and at least one connector configured to couple said first portion and said second portion together, the at least one connector defining a first grouping of the plurality of cylindrical channels and a second grouping of the plurality of cylindrical channels, the at least one connector including a central connector disposed at a midpoint between the first end and the second end, the central connector including a female connector disposed on a first one of the first portion and a second portion, and a male connector disposed on a second one of the first portion and a second portion;
wherein each channel of said plurality of cylindrical channels is configured to loosely accommodate one cable passing therethrough;
wherein each cylindrical channel includes an upper rim adjacent the top side and a lower rim adjacent the bottom side, the lower rim being tapered to form a conical section with a variable wall thickness and a widest portion of the conical section is disposed closer to the bottom side of said first and second portions and a narrowest portion of the conical section is disposed farthest from the bottom side of said first and second portions.

2. The system of claim 1, wherein said plurality of channels are organized into two equal groupings of cylindrical channels, the two equal groupings being separated by the at least one connector.

3. The system of claim 1, further comprising at least one grip area.

4. The system of claim 3, wherein the at least one grip area comprises a central grip portion disposed at a midpoint between the first end and the second end.

5. The system of claim 3, wherein the at least one grip area comprises a pair of lateral grip portions disposed adjacent the first end and the second end.

6. The system of claim 3, wherein each of the at least one grip area corresponds to a respective one of the at least one connector.

7. The system 1, wherein said first and second portions coupled together are configured to slide to a distal end of said cables; and wherein when said cables are lifted said clamp is configured to slide away from said distal end of said cables.

8. The system of claim 1, wherein the male connector comprises a cylindrical segment and the female connector comprises a recessed gap configured to accept the cylindrical segment.

9. The system of claim 1, wherein the at least one connector comprises a pair of lateral connectors disposed adjacent the first end and the second end, each of the pair of lateral connectors including a female connector disposed on a first one of the first portion and a second portion, and a male connector disposed on a second one of the first portion and a second portion.

10. The system of claim 1, wherein each of the first portion and a second portion includes a sidewall having a plurality of outwardly curved sidewalls corresponding to the plurality of cylindrical channels.

11. The system of claim 1, wherein each of the first portion and a second portion includes a uniform and flat sidewall with a predetermined sidewall thickness, the predetermined sidewall thickness being greater than a radius of each of the plurality of cylindrical channels.

12. The system of claim 1, wherein each of the first portion and a second portion includes a uniform and flat sidewall with a predetermined sidewall thickness, each of the plurality of cylindrical channels being absorbed by the first portion and the second portion.

13. The system of claim 1, wherein the male connector and the female connector of the central connector are both disposed at the midpoint between the first end and the second end.

* * * * *